(12) United States Patent
Jeon et al.

(10) Patent No.: US 10,773,348 B2
(45) Date of Patent: Sep. 15, 2020

(54) RECONFIGURABLE JIG DEVICE

(71) Applicant: ELECTRONICS AND TELECOMMUNICATIONS RESEARCH INSTITUTE, Daejeon (KR)

(72) Inventors: Young Ae Jeon, Sejong-si (KR); Hyun Kim, Daejeon (KR); Hyun Jong Kim, Cheongju-si (KR); Ji Yeon Son, Daejeon (KR); Yong Kwi Lee, Daejeon (KR); Hark Jin Lee, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 146 days.

(21) Appl. No.: 16/183,818

(22) Filed: Nov. 8, 2018

(65) Prior Publication Data
US 2019/0351517 A1    Nov. 21, 2019

(30) Foreign Application Priority Data
May 21, 2018    (KR) .......................... 10-2018-0057956

(51) Int. Cl.
*B23Q 1/03*    (2006.01)
*B25B 1/24*    (2006.01)

(52) U.S. Cl.
CPC ............ *B23Q 1/035* (2013.01); *B25B 1/2421* (2013.01)

(58) Field of Classification Search
CPC ............................. B23Q 1/035; B25B 1/2421
See application file for complete search history.

(56) References Cited

U.S. PATENT DOCUMENTS

| 4,047,709 | A | * | 9/1977 | Thyberg | B25B 1/2421 269/22 |
| 4,088,312 | A | * | 5/1978 | Frosch | B23Q 1/035 269/21 |
| 4,684,113 | A | * | 8/1987 | Douglas | B23Q 1/035 269/21 |
| 5,546,784 | A | * | 8/1996 | Haas | B21D 37/02 72/413 |
| 6,363,609 | B1 | | 4/2002 | Pickren | |
| 7,152,651 | B2 | | 12/2006 | Fujiwara | |
| 7,357,385 | B2 | | 4/2008 | Sato | |
| 8,469,345 | B2 | * | 6/2013 | Samac | B23Q 3/06 269/21 |
| 9,035,660 | B2 | | 5/2015 | Yeo | |
| 2002/0050672 | A1 | * | 5/2002 | Moncavage | B25B 1/2421 269/266 |
| 2005/0082731 | A1 | * | 4/2005 | Moore | B25B 11/007 269/266 |
| 2006/0151930 | A1 | * | 7/2006 | Moncavage | B25B 5/061 269/266 |
| 2017/0210570 | A1 | | 7/2017 | Lee et al. | |

* cited by examiner

*Primary Examiner* — Tyrone V Hall, Jr.
(74) *Attorney, Agent, or Firm* — LRK Patent Law Firm

(57) ABSTRACT

A jig device includes an upper end configured to support an object, and a lower end comprising a hole for insertion and coupling of the upper end in an upper portion and an air inlet and an opening and closing portion configured to open and close the air inlet, in a lower portion. A position of the upper end is configured to be fixed at a point in time at which the air inlet is closed due to air pressure that occurs inside the lower end in response to closing the air inlet.

15 Claims, 10 Drawing Sheets

<Case 1>

<Case 2>

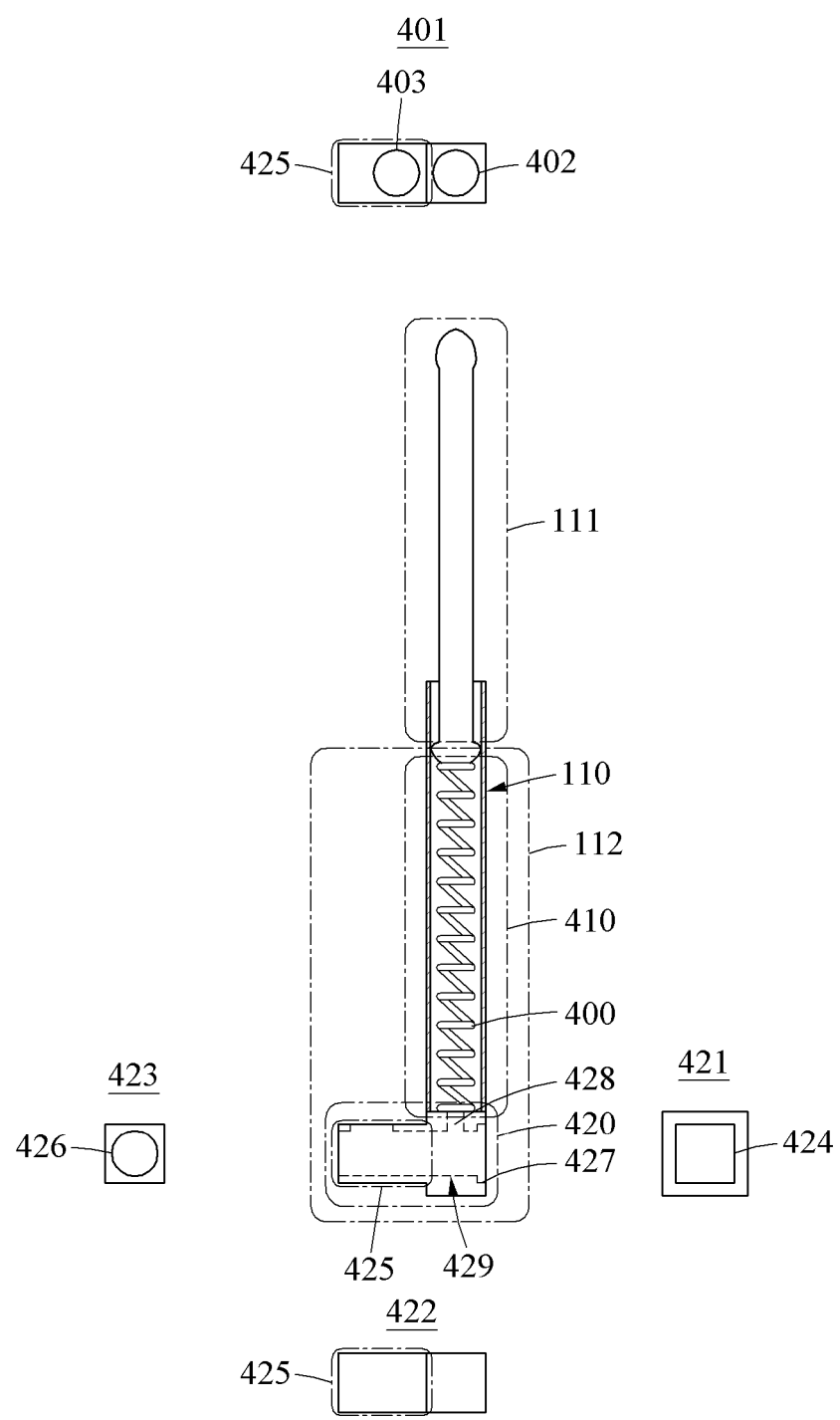

RECONFIGURABLE JIG DEVICE

CROSS-REFERENCE TO RELATED APPLICATION(S)

This application claims the priority benefit of Korean Patent Application No. 10-2018-0057956, filed May 21, 2018, in the Korean Intellectual Property Office, the disclosure of which is incorporated herein by reference for all purposes.

BACKGROUND

1. Field of the Invention

One or more example embodiments relate to a reconfigurable jig device.

2. Description of Related Art

A jig device is a configuration configured to fix positions of parts during assembly or inspection of the parts.

The jig device according to the related art is manufactured to be exclusive for a specific part or a finished product using the specific part. Thus, once a corresponding part is replaced with a new part, the jig device may not be reused to fix the new part. That is, if the part is replaced, there is a need to discard the existing jig device and to manufacture a jig device corresponding to the new part. Accordingly, additional cost is used to manufacture the jig device and a jig device replacement time is also required, which may increase production cost.

Accordingly, there is a need for a jig device that may be reused without being discarded although a corresponding part is replaced with another part.

SUMMARY

At least one example embodiment provides a jig device that may be reconfigurable based on an object to be supported by configuring a jig device through assembly of a detachable first jig, second jig, and third jig.

At least one example embodiment also provides a jig device that may support an object without using electricity by supporting the object using an elastic force of an elastic member inserted into a jig and air pressure occurring in response to closing an air inlet of the jig.

According to an aspect of at least one example embodiment, there is provided a jig device including an upper end configured to support an object; and a lower end including a hole for insertion and coupling of the upper end in an upper portion and an air inlet and an opening and closing portion configured to open and close the air inlet, in a lower portion. A position of the upper end is configured to be fixed at a point in time at which the air inlet is closed due to air pressure that occurs inside the lower end in response to closing the air inlet.

The jig device may further include an elastic member configured to insert into the hole of the lower end in a state of being coupled with a lower portion of the upper end and to provide an elastic force to increase the position of the upper end.

The elastic member may be configured to contract to lower the position of the upper end due to a weight of the object in response to the object being placed on the upper end with the air inlet being open.

The position of the upper end may increase due to the elastic force of the elastic member in response to opening the air inlet in a state in which the air inlet is closed and the position of the upper end is fixed.

In the lower end, a screw thread may be formed inward on one side of the lower portion and an air pressure controller may have the air inlet and may be configured to protrude from the upper portion. A screw-shaped opening and closing portion corresponding to the screw thread may be configured to insert into and thereby couple with the air pressure controller, and whether to open or close the air inlet may be determined based on a depth at which the opening and closing portion inserts into and thereby couples with the air pressure controller.

In the lower end, the air inlet and the opening and closing portion may be formed on one side of the lower portion and a coupler configured to couple with another jig device may be formed on another side of the lower portion.

According to an aspect of at least one of example embodiment, there is provided a jig device including a first jig including an air inlet and an opening and closing portion configured to open and close the air inlet in a lower portion, and configured to fix a position of an object with air pressure that occurs in response to closing the air inlet; a third jig including an air inlet and an opening and closing portion configured to open and close the air inlet in a lower portion, and configured to couple with the first jig; and at least one second jig configured to couple between the first jig and the third jig.

The first jig may include an upper end configured to support an object; and a lower end including a hole for insertion and coupling of the upper end and an elastic member in an upper portion, and the air inlet, the opening and closing portion, and a coupler configured to couple with the second jig in the lower portion.

In the lower end of the first jig, a screw thread may be formed inward on one side of the lower portion, an air pressure controller may have the air inlet and may be configured to protrude from the upper portion, the coupler may be formed on another side of the lower portion, and the hole may be configured to connect to a hole of the second jig. A screw-shaped opening and closing portion corresponding to the screw thread may be configured to insert into and thereby couple with the air pressure controller. Whether to open or close the air inlet may be determined based on a depth at which the opening and closing portion inserts into and thereby couples with the air pressure controller.

The coupler of the first jig may include a hole for insertion and coupling of a coupler of the second jig.

The second jig may include an upper end configured to support an object; a lower end including a hole for insertion and coupling of the upper end and an elastic member in an upper portion and at least two couplers configured to couple with the first jig, another second jig, or the third jig in a lower portion; and the elastic member configured to insert into and couple with the lower end at a state of being coupled with a lower portion of the upper end and to provide an elastic force to increase a position of the upper end.

The at least two couplers may include a first coupler formed on one side of the lower end and including a hole for insertion and coupling with a coupler of the first jig or a coupler of the other second jig; and a second coupler formed to face the first coupler in the lower end, and including a protrusion configured to insert into and couple with the coupler of the other second jig and a coupler of the third jig.

The third jig may include an upper end configured to support an object; and a lower end including a hole for insertion and coupling of the upper end and an elastic member in an upper portion, and an air inlet, an opening and closing portion, and a coupler configured to couple with the second jig in a lower portion.

In the lower end of the third jig, a screw thread may be formed inward on one side of the lower portion, an air pressure controller may have the air inlet and may be configured to protrude from the upper portion, the coupler may be configured to protrude from another side of the lower portion, and a hole may be configured to connect to a hole of the second jig. A screw-shaped opening and closing portion corresponding to the screw thread may be configured to insert into and thereby couple with the air pressure controller. Whether to open or close the air inlet may be determined based on a depth at which the opening and closing portion inserts into and thereby couples with the air pressure controller.

The coupler may include a protrusion configured to insert into and couple with the coupler of the second jig.

According to example embodiments, there may be provided a jig device that may be reconfigurable based on an object to be supported by configuring the jig device through assembly of a detachable first jig, second jig, and third jig.

Also, according to example embodiments, there may be provided a reconfigurable jig device that may prevent occurrence of cost according to discarding an existing jig device in response to replacing an object and purchasing a new jig device corresponding to a new object and may reduce an amount of time used to replace the jig device.

Also, according to example embodiments, there is provided a reconfigurable jig device that may replace an object without causing additional cost since there is no need to discard an existing jig device and replace the jig device with a new jig device in response to replacing the object.

Also, according to example embodiments, there may be provided a reconfigurable jig device that may support an object without using electricity by supporting the object using an elastic force of an elastic member inserted into a jig and an air pressure occurring in response to closing an air inlet of the jig.

Also, according to example embodiments, there may be provided a jig device that may easily adjust a height of an object by opening an air inlet of a jig and reducing an air pressure when the height of the object is to be adjusted.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 4 illustrates an example of a first jig according to an example embodiment;

DETAILED DESCRIPTION

Figure 1:
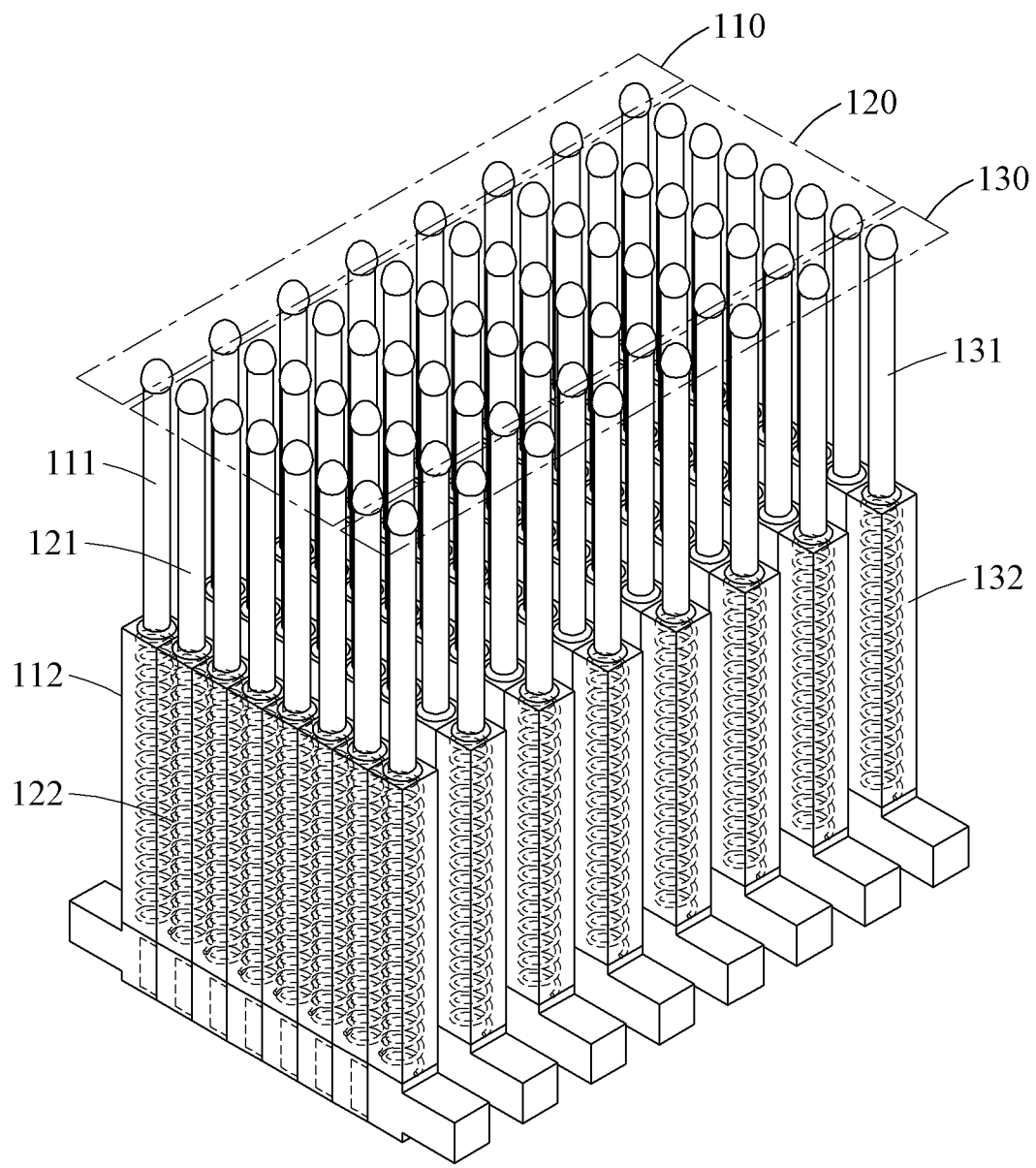
FIG. 1 is a perspective view of a jig device according to an example embodiment.

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

The following detailed structural or functional description of example embodiments is provided as an example only and various alterations and modifications may be made to the example embodiments. Accordingly, the example embodiments are not construed as being limited to the disclosure and should be understood to include all changes, equivalents, and replacements within the technical scope of the disclosure.

Terms used herein are to describe the example embodiments and are not construed as limiting. The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, are to be interpreted as having a meaning that is consistent with their meaning in the context of the relevant art, and are not to be interpreted in an idealized or overly formal sense unless expressly so defined herein.

FIG. 1 is a perspective view of a jig device according to an example embodiment.

Referring to FIG. 1, the jig device may include a first jig 110, at least one second jig 120, and a third jig 130, and may be reconfigurable based on an object to be supported by the jig device. Here, the jig device may be configured using detachable N×M jigs. Here, N refers to a horizontal direction and M refers to a vertical direction. For example, the object may be one of a part of which a position is to be fixed using the jig device and a product manufactured such parts.

The first jig 110 and the third jig 130 couple at both ends of the second jigs 120. The jig device may include M first jigs 110, M third jigs 130, and M*(N−2) second jigs 120.

The first jig 110 may include an upper end 111 configured to support the object and a lower end 112 configured to couple with the upper end 111 through insertion. Here, an air inlet and an opening and closing portion configured to open and close the air inlet may be formed in a lower portion of the lower end 112. The first jig 110 may fix a position or a height of the object using air pressure generated in response to closing the air inlet. When the object is deviated from the jig device with the air inlet being open, a position of the upper end 111 may return to an initial position due to an elastic force of an elastic member that supports the upper end 111. Also, a coupler configured to couple with the second jig 120 may be formed in a lower portion of the lower end 112.

A configuration of the first jig 110 will be further described with reference to FIG. 4.

The second jig 120 may include an upper end 121 configured to support the object and a lower end 122 configured to couple with the upper end 121 through insertion. The second jig 120 may be provided between the first jig 110 and the third jig 130. The upper end 121 may insert into the lower end 122 due to the object. Also, when the object is deviated from the jig device with the air inlet being open, a position of the upper end 121 may return to an initial position due to an elastic force of an elastic member that supports the upper end 121.

A configuration of the second jig 120 will be further described with reference to FIG. 5.

The third jig 130 may include an upper end 131 configured to support the object and a lower end 132 configured to couple with the upper end 131 through insertion. An air inlet and an opening and closing portion configured to open and close the air inlet may be formed in a lower portion of the lower end 132. The third jig 130 may fix a position or a height of the object using air pressure that occurs in response to closing the air inlet. When the object is deviated from the jig device with the air inlet being open, a position of the upper end 131 may return to an initial position due to an elastic force of an elastic member that supports the upper end 131.

A configuration of the third jig 130 will be further described with reference to FIG. 6.

The jig device may be configured by assembling the first jig 110, the second jig 120, and the third jig 130 that are detachable. That is, the jig device according to example embodiments may be reconfigured based on a new object and thereby recyclable although the object to be supported is replaced with the new object. Accordingly, it is possible to prevent occurrence of additional cost according to discarding the existing jig device and purchasing a new jig device corresponding to the new object and to reduce an amount of time used to replace the jig device.

Also, although the object is replaced, there is no need to discard the existing jig device and to replace the jig device with the new jig device. Therefore, it is possible to replace the object without causing the occurrence of additional cost. Also, the jig device may be applied to an alternative production in which an object to be fixed by the jig device adaptively varies depending on circumstances.

The jig device may support the object using the elastic force of the elastic member inserted into each of the first jig 110, the second jig 120, and the third jig 130, and the air pressure that occurs in response to closing the air inlet of the first jig 110 and the air inlet of the third jig 130. Thus, the jig device may support the object without using electricity.

Also, if a height of the object is to be adjusted, the jig device may reduce the air pressure by opening the air inlet of the first jig 110 and the air inlet of the third jig 130 and may easily adjust the height of the object. Here, the jig device may simultaneously open or close the air inlet of the first jig 110 and the air inlet of the third jig 130 using gears.

Figure 2:
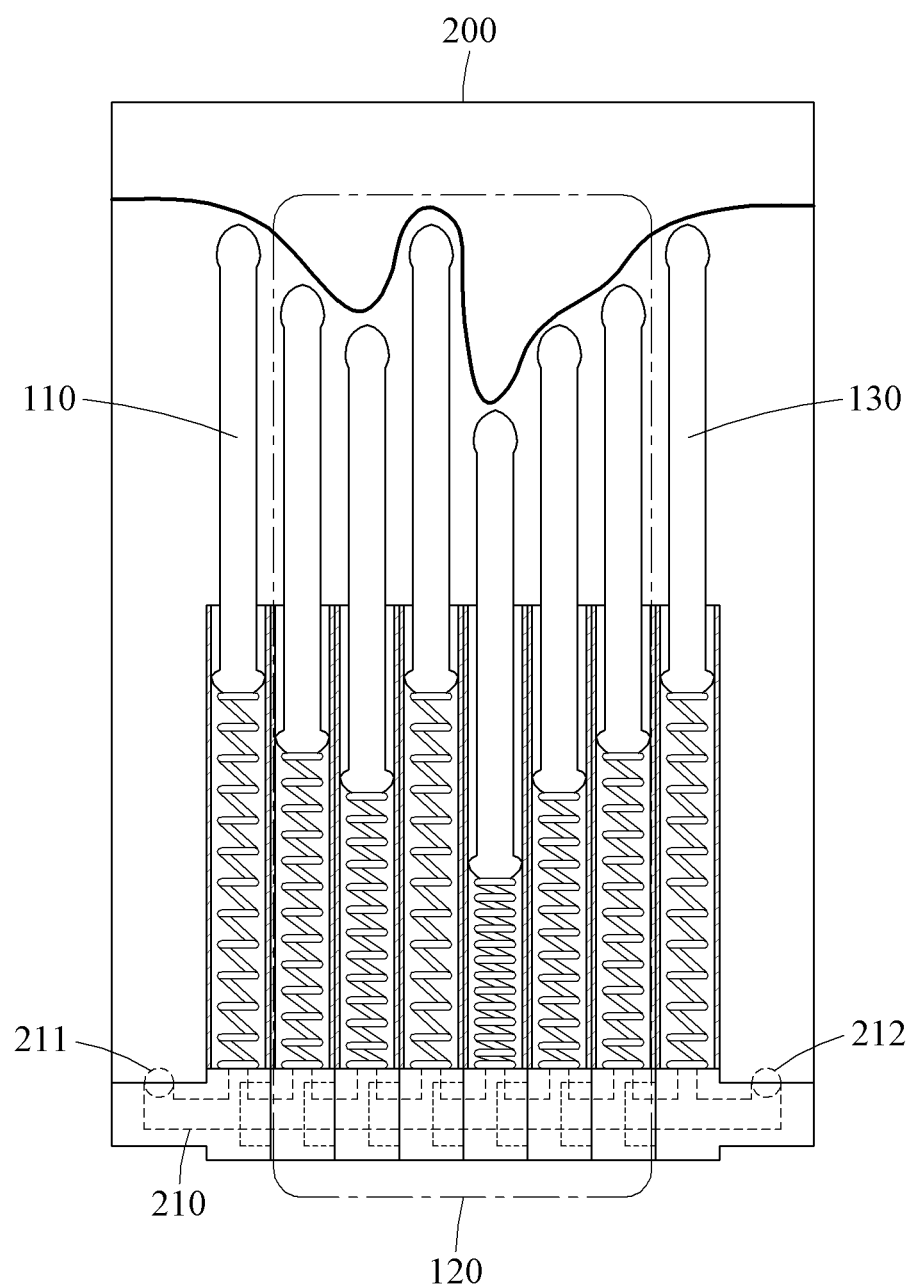
FIG. 2 illustrates an example of a state in which an object is supported using a jig device according to an example embodiment.

FIG. 2 illustrates an example of a state in which an object is supported using a jig device according to an example embodiment.

Referring to FIG. 2, an object 200 of which a bottom surface is curved may be placed on the jig device in a state in which an air inlet 211 of the first jig 110 and an air inlet 212 of the third jig 130 are open. Here, an upper end height of each of the first jig 110, the second jig 120, and the third jig 130 may flexibly vary based on a lower end curve of the object 200.

A hole 210 may be formed in a lower portion of a lower end of each of the first jig 110, the second jig 120, and the third jig 130. The air inlet 211 of the first jig 110 and the air inlet 212 of the third jig 130 may be formed at both ends of the hole 210, respectively.

Accordingly, the air pressed downward of a jig by an upper end of a jig of which a height is reduced based on the lower end curve of the object 200 may be discharged to the air inlet 211 of the first jig 110 and the air inlet 212 of the third jig 130 through the hole 210.

Also, when the air inlet 211 of the first jig 110 and the air inlet 212 of the third jig 130 are blocked, the upper end height of each of the first jig 110, the second jig 120, and the third jig 130 may be fixed due to the air pressure inside the hole 210.

Figure 3A:
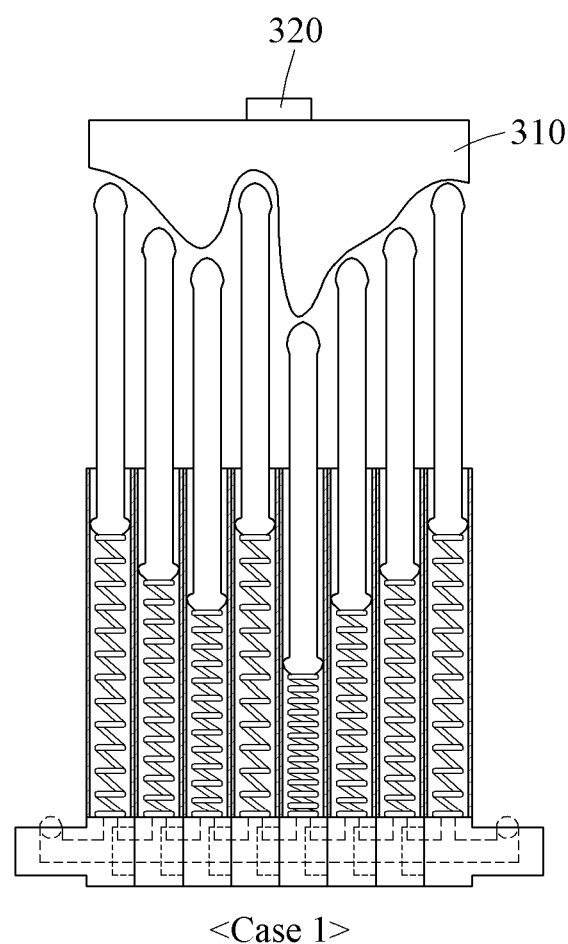
FIGS. 3A and 3B illustrate examples of a process of verifying a gradient in a jig device according to an example embodiment.
Figure 3B:
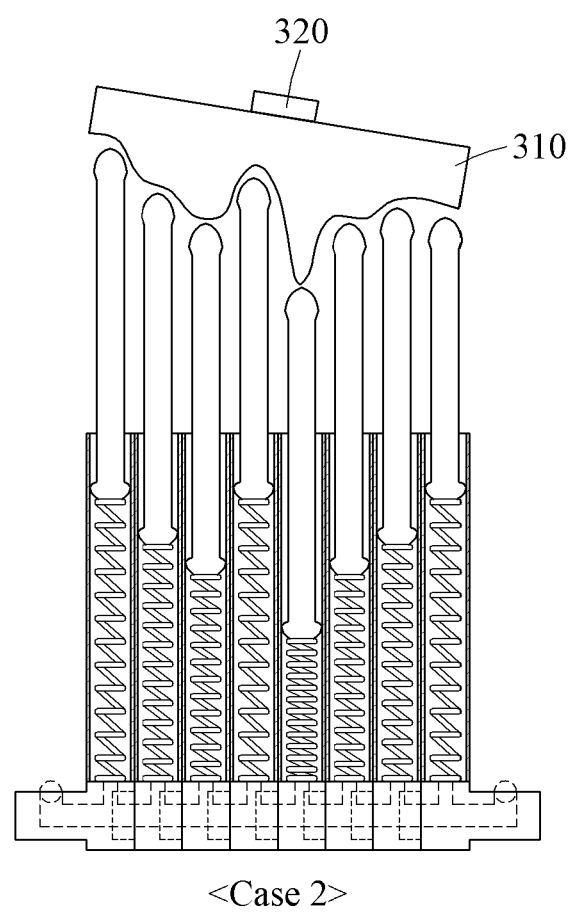

FIGS. 3A and 3B illustrate examples of a process of verifying a gradient in a jig device according to an example embodiment.

A measurer 320 configured to verify at least one of a verticality, a horizontality, and a gradient may be provided on an object 310.

Referring to case 1 of FIG. 3A, when the measurer 320 measures that the object 310 is in a balanced state, the first jig 110, the second jig 120, and the third jig 130 of the jig device may support the object 310 at a height corresponding to the lower end curve of the object 310.

Referring to case 2 of FIG. 3B, when the measurer 320 measures that the object 310 is in an inclined state, at least one of the first jig 110, the second jig 120, and the third jig 130 of the jig device may support the object 310 at a height not corresponding to the lower end curve of the object 200. Here, the measurer 320 may display at least one of an inclined direction and an angle of inclination to induce a user to open an air inlet of the jig device and adjust heights of the first jig 110, the second jig 120, and the third jig 130.

FIG. 4 illustrates an example of a first jig according to an example embodiment Referring to FIG. 4, the first jig 110 may include the upper end 111, the lower end 112, and an elastic member 400.

The lower end 112 may include an upper portion 410 and a lower portion 420. Referring to a top view 401 of the first jig 110, a hole 402 for insertion and coupling of the upper end 111 and the elastic member 400 may be formed in the upper portion 410 of the lower end 112. Here, referring to FIG. 4, the elastic member 400 may insert into and couple with the hole 402 of the lower end 112 in a state of being coupled with a lower portion of the upper end 111 and may provide an elastic force to increase a position of the upper end 111. For example, the elastic member 400 may be a spring. In addition to the spring, any type of parts capable of providing the elastic force such that the position of the upper end 111 may become high may be used as the elastic member 400.

Also, a coupler 424 configured to couple with the second jig 120 may be formed on one side of the lower portion 420 of the lower end 112, and an air pressure controller 425 may protrude from another side thereof.

Referring to a right-side view 421 of the first jig 110, the coupler 424 may be a hole which a coupler of the second jig 120 inserts into and couples with. Although FIG. 4 illustrates that the coupler 424 is provided as a square hole, it is provided as an example only. The coupler 424 may be a hole in a cylindrical shape or a polygonal shape based on a shape of the coupler of the second jig 120.

Referring to the top view 401 and a bottom view 422 of the first jig 110, the air pressure controller 425 may have a step compared to other portions of the lower end 112. Also, an air inlet 403 may be formed in the air pressure controller 425.

The air inlet 403 may be formed on a top surface of the air pressure controller 425 herein, and may be formed on a side or a bottom surface of the air pressure controller 425 depending on example embodiments.

Referring to a left-side view 423 of the first jig 110, a hole 426 into which an opening and closing portion configured to open and close the air inlet 403 may be formed in the air pressure controller 425. Here, a hole 429 configured to transfer the air passing through the air inlet 403 to the second jig 120 and the upper portion 410 may be connected in the hole 426. Also, the hole 429 may include a hole 428 configured to allow the air present within the upper portion 410 to pass and a hole 427 configured to connect to a hole of the coupler of the second jig 120 inserted into the coupler 424.

When the air inlet 403 is closed, a position of the upper end 111 may be fixed at a point in time at which the air inlet 403 is closed due to the air pressure that occurs in the lower end 112.

In detail, when an object is placed above the first jig 110, the elastic member 400 may be contracted due to a weight of the object and a height of the upper end 111 may be lowered.

Here, when the air inlet 403 is closed, the air present within the upper portion 410 may not be leaked to the outside. Accordingly, as the height of the upper end 111 becomes lower, the air pressure present within the upper portion 410 may increase and the height of the upper end 111 may be maintained not to be less than a predetermined height. On the contrary, when the air inlet 403 is open, the air present within the upper portion 410 may be leaked to the outside and the air pressure present within the upper portion 410 may not increase although the height of the upper end 111 is lowered. Accordingly, the height of the upper end 111 may be lowered by contraction limit of the elastic member 400.

An inner surface area of the lower end 112 in a state in which the upper end 111 is at an initial position may be greater than that of the lower end 112 in a state in which the height of the upper end 111 is lowered. Accordingly, when the height of the lower end 112 returns to the initial position in a state in which the height of the upper end 111 is lowered, air may be required to fill in the widened inner surface area of the lower end 112.

That is, when the object is removed from above the first jig 110 in a state in which the air inlet 403 is closed, the air may not flow in the lower end 112. The height of the upper end 111 may not increase due to the elastic force of the elastic member 400 and may be maintained at a state in which the height of the upper end 111 is lowered.

Here, when the air inlet 403 is open, the air pressure used to maintain the inner surface area of the lower end 112 may decrease due to the air that flows in through the air inlet 403 and the height of the upper end 111 may return to the initial position due to the elastic force of the elastic member 400.

Also, when the height of the upper end 111 does not return to the initial position in a state in which the air inlet 403 is open, the elastic member 400 may operate so that the height of the upper end 111 may return to the initial position in response to pressing the upper end 111 toward the lower end 112.

Figure 5:
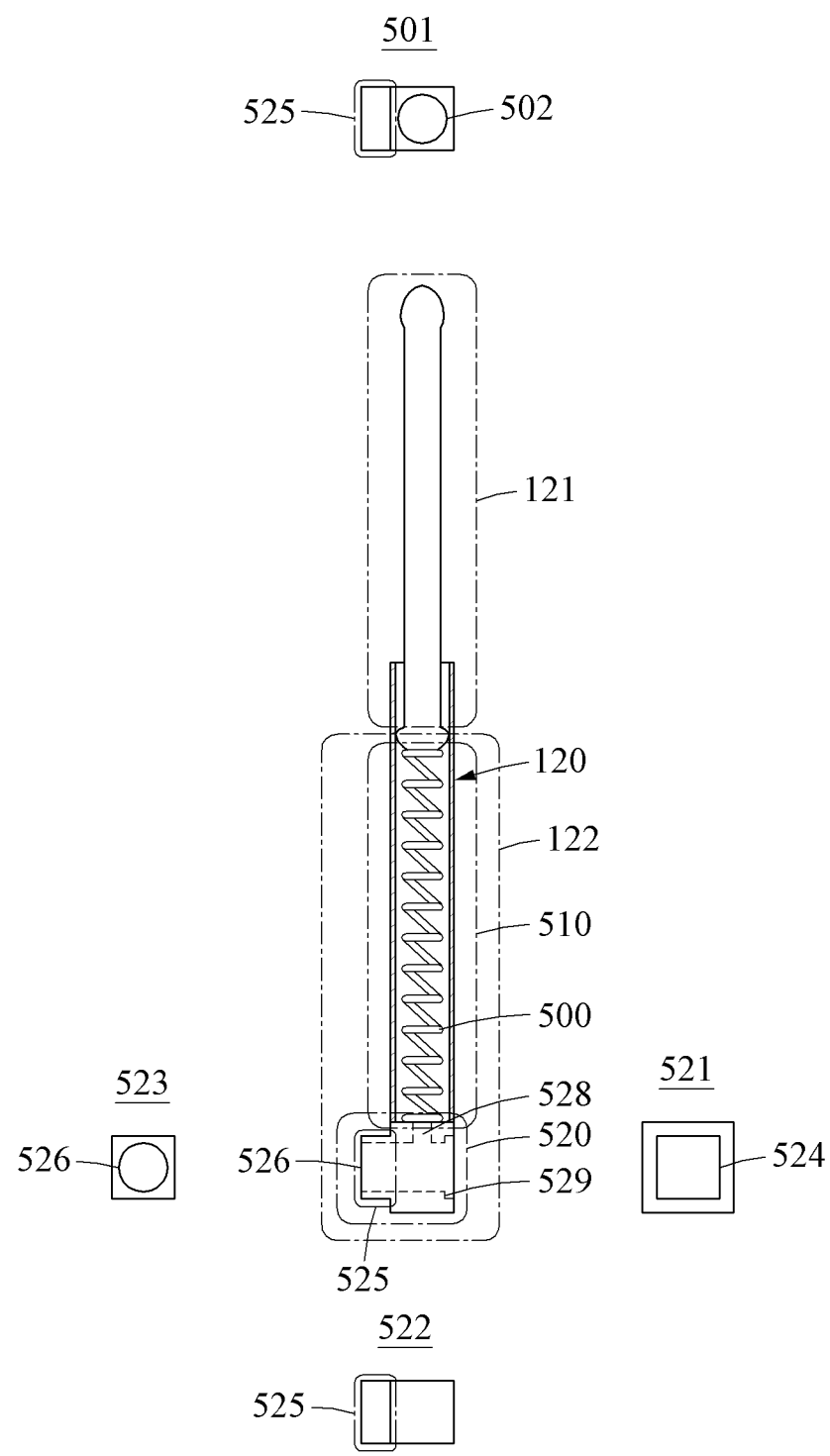
FIG. 5 illustrates an example of a second jig according to an example embodiment.

FIG. 5 illustrates an example of a second jig according to an example embodiment.

Referring to FIG. 5, the second jig 120 may include the upper end 121, the lower end 122, and an elastic member 500.

The lower end 122 may include an upper portion 510 and a lower portion 520. Referring to a top view 501 of the second jig 120, a hole 502 for insertion and coupling of the upper end 121 and the elastic member 500 may be formed in the upper portion 510 of the lower end 122. Here, referring to FIG. 5, the elastic member 500 may insert into and couple with the hole 502 of the lower end 122 in a state of being coupled at a lower portion of the upper end 121 and may provide an elastic force to increase a position of the upper end 121. For example, the elastic member 500 may be a spring. In addition to the spring, any type of parts capable of providing the elastic force such that the position of the upper end 121 may become high may be used as the elastic member 500.

Also, a first coupler 524 configured to couple with the third jig 130 or another second jig may be formed on one side of the lower portion 520 of the lower end 122, and a second coupler 525 configured to couple with the first jig 110 or the other second jig may protrude from another side thereof.

Referring to a right-side view 521 of the second jig 120, the first coupler 524 may be a hole which a second coupler of the other second jig or the third jig 130 inserts into and couples with. Although FIG. 5 illustrates that the first coupler 524 as a square hole, it is provided as an example only. The first coupler 524 may be a hole in a cylindrical shape or a polygonal shape based on a shape of the second coupler of the other second jig or the third jig 130.

Referring to the top view 501 and a bottom view 522 of the second jig 120, the second coupler 525 may have a step compared to other portions of the lower end 122. Here, a step between the second coupler 525 and the other portion of the lower end 122 may have a thickness identical to a thickness of a hole of a first coupler of the other second jig or the coupler 424 of the first jig 110.

The second coupler 525 may insert into and couple with the first coupler of the other second jig or the coupler 424 of the first jig 110. Also, referring to a left-side view 523 of the second jig 120, a hole 526 may be formed in the second coupler 525.

Here, the hole 526 may include a hole 528 configured to allow the air present within the upper portion 510 to pass and a hole 529 configured to connect to a hole of the coupler of the third jig 130 inserted into and coupled with the first coupler 424 or the second coupler of the other second jig. The hole 526 may connect to the holes formed in lower portions of lower ends of the first jig 110, the other second jig, and the third jig 130 and thereby may constitute the hole 210 of FIG. 2.

Also, when the first coupler of the other second jig or the coupler 424 of the first jig 110 is in a square shape, the second coupler 525 may be provided as a square pillar of FIG. 5. Also, the second coupler 525 may be in a shape of a cylindrical pillar or a polygonal pillar based on a shape of the first coupler of the other second jig or the coupler 424 of the first jig 110.

When an object is placed above the second jig 120, the elastic member 500 may be contracted due to a weight of the object and a height of the upper end 121 may be lowered. When the object is removed from above the second jig 120, the height of the upper end 121 may return to an initial position due to the elastic force of the elastic member 500.

Figure 6:
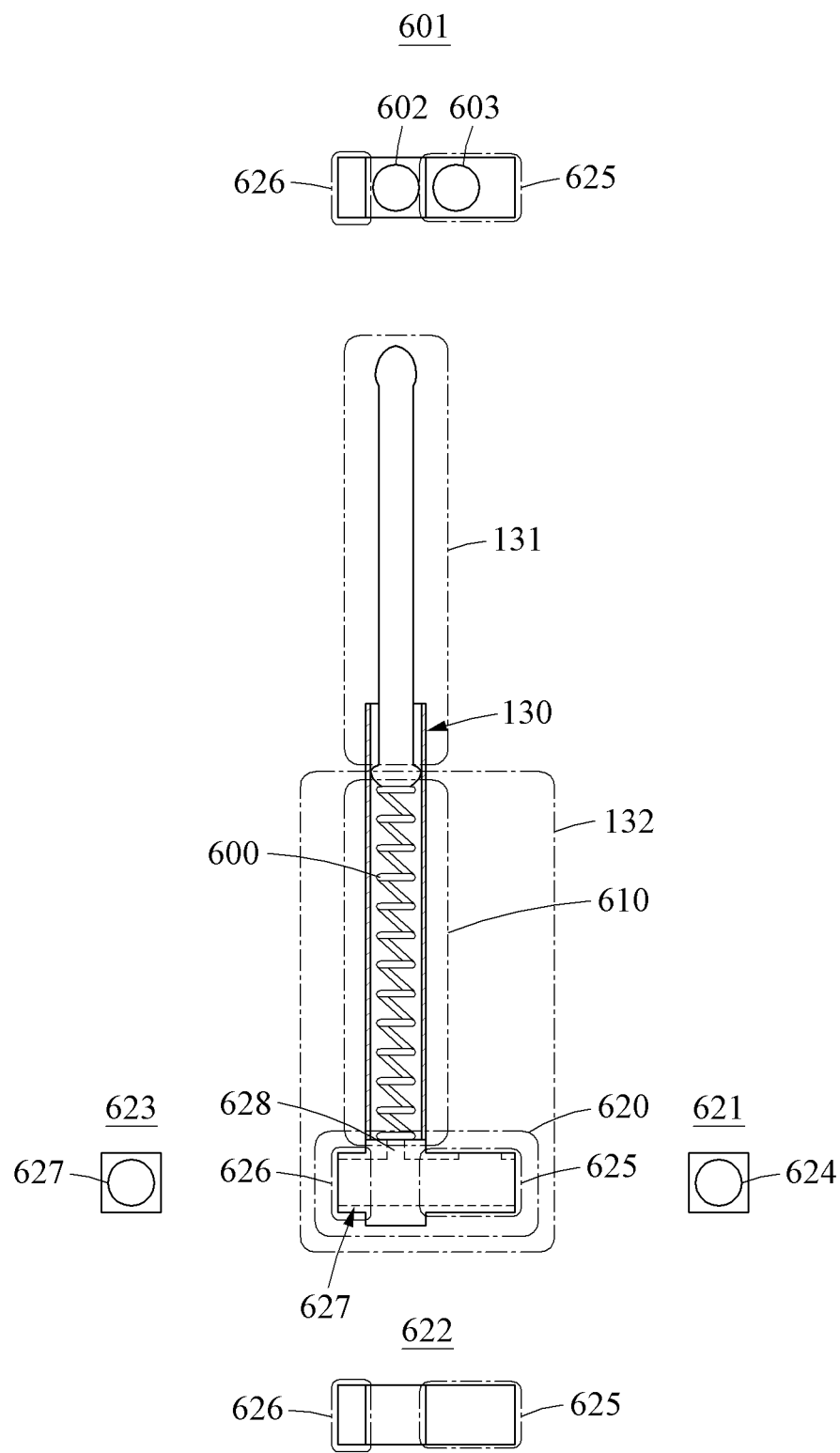
FIG. 6 illustrates an example of a third jig according to an example embodiment.

FIG. 6 illustrates an example of a third jig according to an example embodiment.

Referring to FIG. 6, the third jig 130 may include the upper end 131, the lower end 132, and an elastic member 600.

The lower end 132 may include an upper portion 610 and a lower portion 620. Referring to a top view 601 of the third jig 130, a hole 602 for insertion and coupling of the upper end 131 and the elastic member 600 may be formed in the upper portion 610 of the lower end 132. Here, the elastic member 600 may insert into and couple with the hole 602 of the lower end 132 in a state of being coupled with a lower portion of the upper end 131 and may provide an elastic force to increase a position of the upper end 131. For example, the elastic member 600 may be a spring. In addition to the spring, any type of parts capable of providing the elastic force to increase the position of the upper end 131 may be used as the elastic member 600.

Also, a coupler 626 configured to insert into and couple with the second jig 120 may be formed on one side of the lower portion 620 of the lower end 132, and an air pressure controller 625 may protrude from another side thereof.

Referring to the top view 601 and a bottom view 622 of the third jig 130, the air pressure controller 625 may have a step compared to other portions of the lower end 132. Also, an air inlet 603 may be formed in the air pressure controller 625.

Here, the air inlet 603 may be formed on a top surface of the air pressure controller 625 herein, and may be formed on a side or a bottom surface of the air pressure controller 625 depending on example embodiments.

Referring to a right-side view 621 of the third jig 130, a hole 624 into which an opening and closing portion configured to open or close the air inlet 603 inserts may be formed on the air pressure controller 625.

When the air inlet 603 is closed, a position of the upper end 131 may be fixed at a point in time at which the air inlet 603 is closed due to the air pressure that occurs in the lower end 132.

In detail, when an object is placed above the third jig 130, the elastic member 600 may be contracted due to a weight of the object and a height of the upper end 131 may be lowered.

Here, when the air inlet 603 is closed, the air present within the upper portion 610 may not be leaked to the outside. Accordingly, as the height of the upper end 131 becomes lower, the air pressure within the upper portion 610 may increase and the height of the upper end 131 may be maintained not to be less than a predetermined height. On the contrary, when the air inlet 603 is open, the air present within the upper portion 610 may be leaked to the outside regardless of a decrease in the height of the upper end 131. Accordingly, the air pressure within the upper portion 610 may not increase and the height of the upper end 131 may be lowered by contraction limit of the elastic member 600.

An inner surface area of the lower end 132 in a state in which the upper end 131 is at an initial position may be greater than that of the lower end 132 in a state in which the height of the upper end 131 is lowered. Accordingly, when the height of the upper end 131 returns to the initial position in a state in which the height of the upper end 131 is lowered, the air may be required to fill in the widened inner surface area of the lower end 132.

That is, when the object is removed from above the third jig 130 in a state in which the air inlet 603 is closed, the air may not flow in the lower end 132. The height of the upper end 131 may not increase due to the elastic force of the elastic member 600 and may be maintained at a height in a state in which the height of the upper end 131 is lowered.

Here, when the air inlet 603 is open, the air pressure used to maintain the inner surface area of the lower end 132 may decrease due to the air that flows in through the air inlet 603 and the height of the upper end 131 may return to the initial position due to the elastic force of the elastic member 600.

Also, when the height of the upper end 131 does not return to the initial position in a state in which the air inlet 603 is open, the elastic member 600 may operate so that the height of the upper end 131 may return to the initial position in response to pressing the upper end 131 toward the lower end 132.

Referring to the top view 601 and the bottom view 622 of the third jig 130, the coupler 626 may have a step compared to other portions of the lower end 132. Here, a step between the coupler 626 and the other portion of the lower end 132 may have a thickness identical to a thickness of a hole of the first coupler 524 of the second jig 120.

The coupler 626 may insert into and couple with the first coupler 524 of the second jig 120. Also, referring to a left-side view 623 of the third jig 130, a hole 627 may be formed in the coupler 626.

Here, the hole 627 may include a hole 628 configured to allow the air present within the upper portion 610 to pass and may connect to the hole 624. Accordingly, the air that passes through the hole 627 may be leaked to the outside through the air inlet 603. Alternatively, the air that flows in from the outside through the air inlet 603 may move to the first jig 110 and the second jig 120 through the hole 627. The hole 627 may connect to the hole 526 of the second jig 120, thereby constituting the hole 210 of FIG. 2.

Also, when the first coupler 524 of the second jig 120 is in a square shape, the coupler 626 may be provided as a square pillar of FIG. 6. Also, the coupler 626 may be in a shape of a cylindrical pillar or a polygonal shape based on the shape of the first coupler 524 of the second jig 120.

Figure 7:
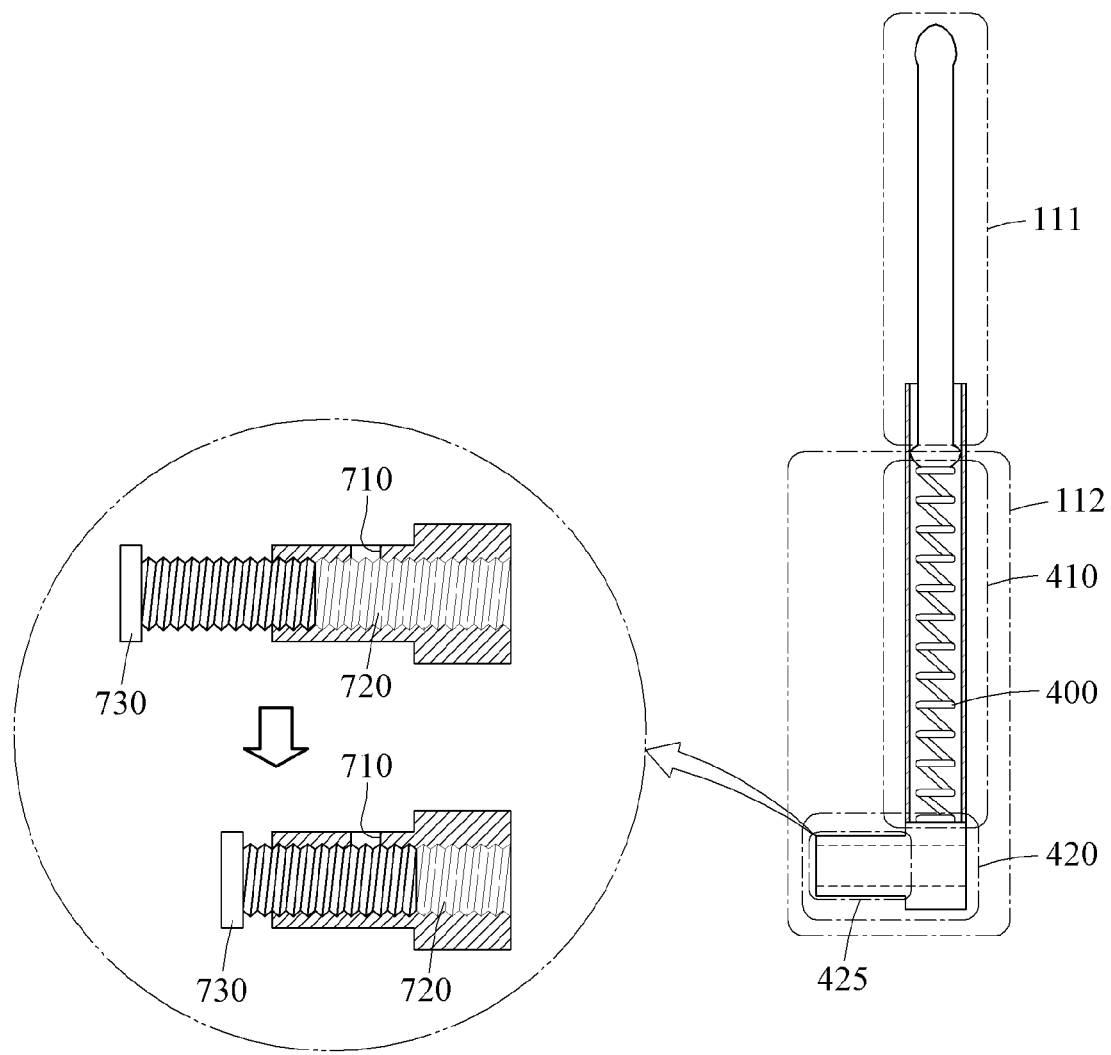
FIG. 7 illustrates an example of an air pressure controller of a first jig according to an example embodiment.

FIG. 7 illustrates an example of an air pressure controller of a first jig according to an example embodiment.

Referring to FIG. 7, a screw thread 720 may be provided in the air pressure controller 425 of the first jig 110 and an air inlet 710 may be formed in an upper portion thereof. A screw-shaped opening and closing portion 730 corresponding to the screw thread 720 may insert into and couple with the air pressure controller 425.

Referring to FIG. 7, when a tip of the opening and closing portion 730 is not inserted by the air inlet 710, the air inlet 710 may be in an open state. Here, the outside air may flow in the upper portion 410 of the lower end 112 through the air inlet 710. Alternatively, the air present within the upper portion 410 of the lower end 112 may be leaked to the outside through the air inlet 710.

On the contrary, when the tip of the opening and closing portion 730 is inserted tightly by the air inlet 710, the air inlet 710 may be in a closed state. Here, the outside air and the air present within the upper portion 410 of the lower end 112 may not move. Thus, when the upper end 111 descends due to an object, the air pressure within the upper portion 410 of the lower end 112 may increase and may fix a position of the upper end 111.

Also, the opening and closing portion 730 may be provided in a gear shape and may rotate with an opening and closing portion of another first jig.

Figure 8:
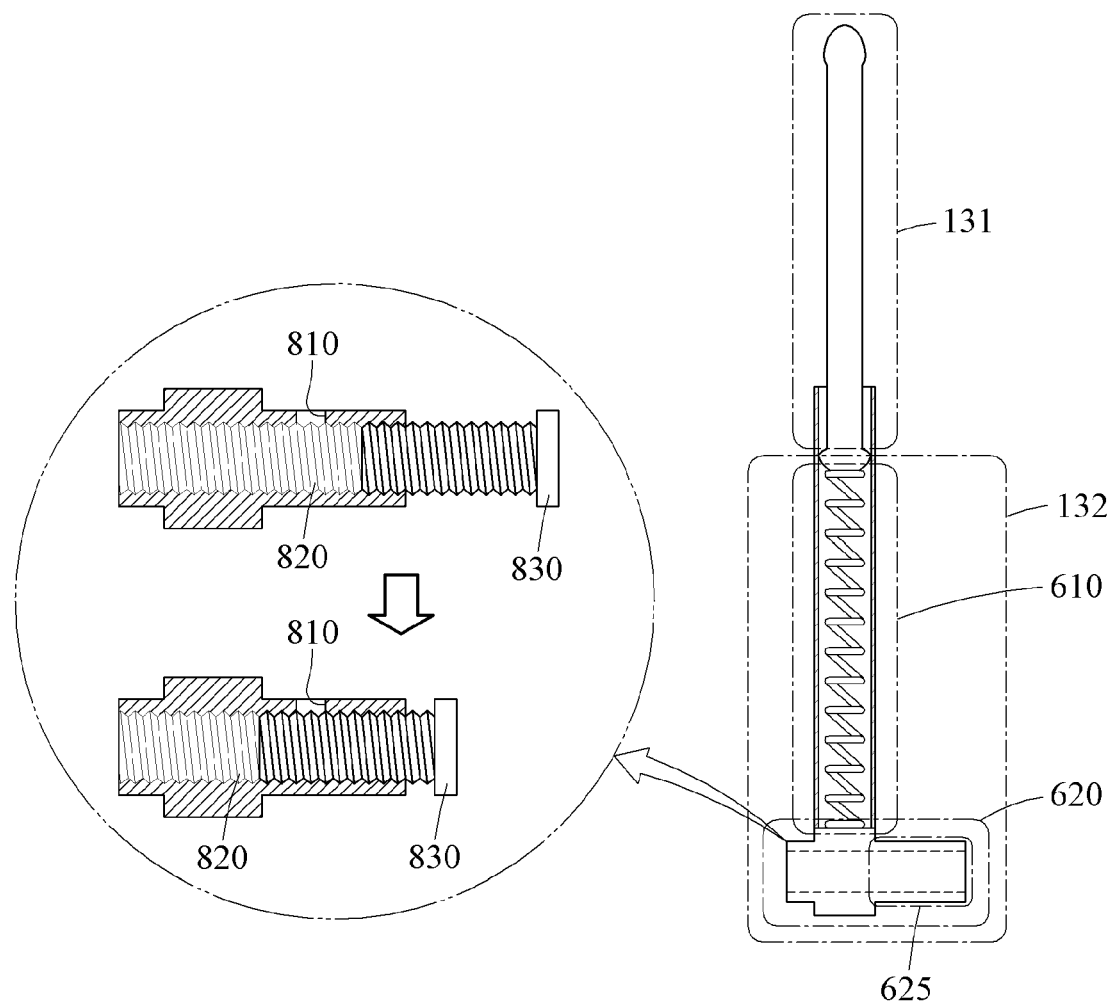
FIG. 8 illustrates an example of an air pressure controller of a third jig according to an example embodiment.

FIG. 8 illustrates an example of an air pressure controller of a third jig according to an example embodiment.

Referring to FIG. 8, a screw thread 820 may be provided in the air pressure controller 625 of the third jig 130 and an air inlet 810 may be formed in an upper portion thereof. A screw-shaped opening and closing portion 830 corresponding to the screw thread 820 may insert into and couple with the air pressure controller 625.

Referring to FIG. 8, when a tip of the opening and closing portion 830 is not inserted by the air inlet 810, the air inlet 810 may be in an open state. Here, the outside air may flow in the upper portion 610 of the lower end 132 through the air inlet 810. Alternatively, the air present within the upper portion 610 of the lower end 132 may be leaked to the outside through the air inlet 810.

On the contrary, when the tip of the opening and closing portion 830 is inserted to be further inward than the air inlet 810, the air inlet 810 may be in a closed state. Here, the outside air and the air present within the upper portion 610 of the lower end 132 may not move. Thus, when the upper end 131 descends due to an object, the air pressure within the upper portion 610 of the lower end 132 may increase and may fix a position of the upper end 131.

Also, the opening and closing portion 830 may be provided in a gear shape and may rotate together with an opening and closing portion of another third jig.

Figure 9:
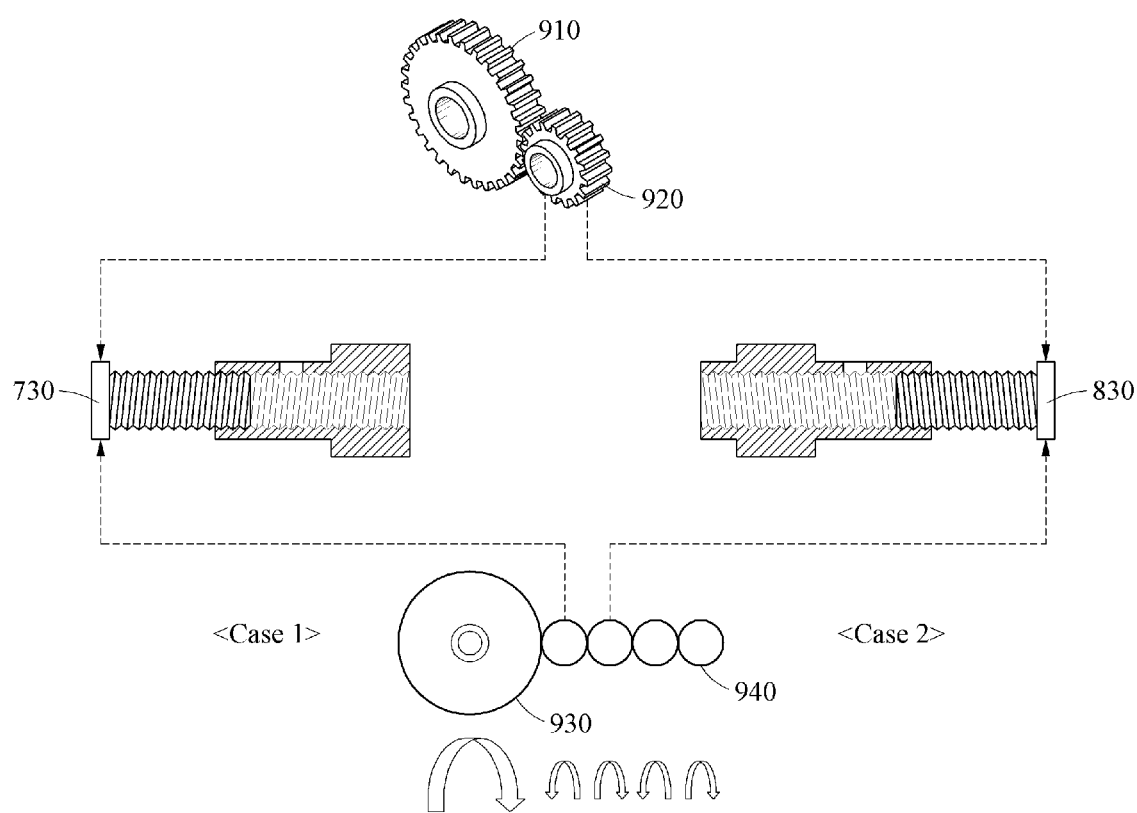
FIG. 9 illustrates an example of a method of operating an opening and closing portion according to an example embodiment.

FIG. 9 illustrates an example of a method of operating an opening and closing portion according to an example embodiment.

Referring to case 1 of FIG. 9, the opening and closing portion 730 of the first jig 110 and the opening and closing portion 830 of the third jig 130 may be a small gear 920 configured to engage with a single large gear 910. Here, the large gear 910 may include a knob for connection to a motor or for manual rotation by a user. Alternatively, the large gear 910 may be an opening and closing portion of another first jig or another third jig.

As the small gear 920 rotates in response to rotation of the large gear 910, the opening and closing portion 730 and the opening and closing portion 830 may insert into or move outward of the air pressure controller 425 of the first jig 110 and the air pressure controller 625 of the third jig 130, respectively.

When the opening and closing portion 730 and the opening and closing portion 830 insert into the air pressure controller 425 of the first jig 110 and the air pressure controller 625 of the third jig 130, respectively, the air inlet 710 of the first jig 110 and the air inlet 810 of the third jig 130 may be closed. Also, when the opening and closing portion 730 and the opening and closing portion 830 move outward of the air pressure controller 425 of the first jig 110 and the air pressure controller 625 of the third jig 130, respectively, the air inlet 710 of the first jig 110 and the air inlet 810 of the third jig 130 may be opened.

Referring to case 2 of FIG. 9, when the jig device includes a plurality of first jigs 110 and a plurality of third jigs 130, the opening and closing portion 730 of the first jig 110 and the opening and closing portion 830 of the third jig 130 may be connected in a structure in which a plurality of gears 940 rotates through mutual engagement. Here, the respective gears 940 may correspond to the opening and closing portion 730 of the first jig 110 and the opening and closing portion 830 of the third jig 130, which differ from each other.

At least one of the opening and closing portions 730 and the opening and closing portions 830 may be a large gear 930 that is larger than other gears and includes a gear-rotating structure. Although FIG. 9 illustrates that the large gear 930 is provided at the front of the first jigs 110 and the third jigs 130, it is provided as an example only. Depending on example embodiment, the large gear 930 may be provided at the rear or in the middle of the gears 940.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A jig device comprising:
an upper end configured to support an object; and
a lower end comprising a hole for insertion and coupling of the upper end in an upper portion and an air inlet and an opening and closing portion configured to open and close the air inlet, in a lower portion, wherein a position of the upper end is configured to be fixed at a point in time at which the air inlet is closed due to air pressure that occurs inside the lower end in response to closing the air inlet.

2. The jig device of claim 1, further comprising:

an elastic member configured to insert into the hole of the lower end in a state of being coupled with a lower portion of the upper end and to provide an elastic force to increase the position of the upper end.

3. The jig device of claim 2, wherein the elastic member is configured to contract to lower the position of the upper end due to a weight of the object in response to the object being placed on the upper end with the air inlet being open.

4. The jig device of claim 2, wherein the position of the upper end increases due to the elastic force of the elastic member in response to opening the air inlet in a state in which the air inlet is closed and the position of the upper end is fixed.

5. The jig device of claim 1, wherein:

in the lower end, a screw thread is formed inward on one side of the lower portion and an air pressure controller has the air inlet and is configured to protrude from the upper portion, a screw-shaped opening and closing portion corresponding to the screw thread is configured to insert into and thereby couple with the air pressure controller, and whether to open or close the air inlet is determined based on a depth at which the opening and closing portion inserts into and thereby couples with the air pressure controller.

6. The jig device of claim 1, wherein, in the lower end, the air inlet and the opening and closing portion are formed on one side of the lower portion and a coupler configured to couple with another jig device is formed on another side of the lower portion.

7. A jig device comprising:

a first jig comprising an air inlet and an opening and closing portion configured to open and close the air inlet in a lower portion, and configured to fix a position of an object with air pressure that occurs in response to closing the air inlet;

a third jig comprising an air inlet and an opening and closing portion configured to open and close the air inlet in a lower portion, and configured to couple with the first jig; and at least one second jig configured to couple between the first jig and the third jig.

8. The jig device of claim 7, wherein the first jig comprises:

an upper end configured to support an object; and a lower end comprising a hole for insertion and coupling of the upper end and an elastic member in an upper portion, and the air inlet, the opening and closing portion, and a coupler configured to couple with the second jig in the lower portion.

9. The jig device of claim 8, wherein:

in the lower end of the first jig, a screw thread is formed inward on one side of the lower portion, an air pressure controller has the air inlet and is configured to protrude from the upper portion, the coupler is formed on another side of the lower portion, and the hole is configured to connect to a hole of the second jig, a screw-shaped opening and closing portion corresponding to the screw thread is configured to insert into and thereby couple with the air pressure controller, and whether to open or close the air inlet is determined based on a depth at which the opening and closing portion inserts into and thereby couples with the air pressure controller.

10. The jig device of claim 8, wherein the coupler of the first jig comprises a hole for insertion and coupling of a coupler of the second jig.

11. The jig device of claim 7, wherein:

the second jig comprises:

an upper end configured to support an object;

a lower end comprising a hole for insertion and coupling of the upper end and an elastic member in an upper portion and at least two couplers configured to couple with the first jig, another second jig, or the third jig in a lower portion; and the elastic member configured to insert into and couple with the lower end at a state of being coupled with a lower portion of the upper end and to provide an elastic force to increase a position of the upper end, and the lower end comprises a hole configured to connect to the air inlet of the first jig, a hole configured to connect to an air inlet of the third jig, and a hole configured to connect to a hole of the other second jig.

12. The jig device of claim 11, wherein the at least two couplers comprise:

a first coupler formed on one side of the lower end and comprising a hole for insertion and coupling with a coupler of the first jig or a coupler of the other second jig; and a second coupler formed to face the first coupler in the lower end, and comprising a protrusion configured to insert into and couple with the coupler of the other second jig and a coupler of the third jig.

13. The jig device of claim 7, wherein the third jig comprises:

an upper end configured to support an object; and a lower end comprising a hole for insertion and coupling of the upper end and an elastic member in an upper portion, and an air inlet, an opening and closing portion, and a coupler configured to couple with the second jig in a lower portion.

14. The jig device of claim 13, wherein:

in the lower end of the third jig, a screw thread is formed inward on one side of the lower portion, an air pressure controller has the air inlet and is configured to protrude from the upper portion, the coupler is configured to protrude from another side of the lower portion, and a hole is configured to connect to a hole of the second jig, a screw-shaped opening and closing portion corresponding to the screw thread is configured to insert into and thereby couple with the air pressure controller, and whether to open or close the air inlet is determined based on a depth at which the opening and closing portion inserts into and thereby couples with the air pressure controller.

15. The jig device of claim 13, wherein the coupler comprises a protrusion configured to insert into and couple with the coupler of the second jig.

* * * * *